United States Patent [19]

Jutte et al.

[11] 4,051,290
[45] Sept. 27, 1977

[54] SINK-FREE PANELS

[75] Inventors: Ralph B. Jutte, Granville; Roger L. Lehman, Newark, both of Ohio

[73] Assignee: Owens-Corning Fiberglas Corporation, Toledo, Ohio

[21] Appl. No.: 630,488

[22] Filed: Nov. 10, 1975

Related U.S. Application Data

[63] Continuation of Ser. No. 430,844, Jan. 4, 1974, abandoned.

[51] Int. Cl.$^2$ .......................... B32B 3/00; B29D 3/02
[52] U.S. Cl. ................................. 428/168; 156/209; 156/220; 264/122; 264/255; 428/218; 428/285; 428/209; 428/431
[58] Field of Search ............... 428/168, 285, 409, 431, 428/218; 156/209, 220; 264/122, 255

[56] References Cited

U.S. PATENT DOCUMENTS

| | | | |
|---|---|---|---|
| 3,385,749 | 5/1968 | Hampshire | 428/113 |
| 3,449,482 | 6/1969 | Mitchell et al. | 264/122 |
| 3,507,730 | 4/1970 | Gambill et al. | 264/255 |
| 3,684,645 | 8/1972 | Templ et al. | 428/220 |
| 3,730,808 | 5/1973 | Fekete et al. | 156/332 |
| 3,903,343 | 9/1975 | Ppaff | 428/168 |

FOREIGN PATENT DOCUMENTS 968,773  9/1964  United Kingdom

*Primary Examiner*—George F. Lesmes
*Assistant Examiner*—S. Silverman
*Attorney, Agent, or Firm*—John W. Overman; Hiram P. Settle; Philip R. Cloutier

[57] ABSTRACT

This invention proposes a method for eliminating "sink" in molded glass fiber reinforced panels for automotive and other uses. Such panels are normally formed with integrally molded reinforcement shapes (ribs) and fastening locations (bosses), and a slight depression or "sink" occurs in the exposed panel surface over the location of the ribs and bosses. The present invention proposes the elimination of this sink by utilizing innovative material and design techniques that compliment one another.

The material approach makes use of dual reinforcements; normal chopped glass fibers reinforcement (1 inch or less in length) in combination with a long fiber reinforcement (2 inches or more in length) and preferably a continuous fiber reinforcement. The long fiber reinforcement is placed such that it is oriented in the panel to closely underlie the exposed panel surface. The short chopped fiber, but not the continuous fiber of the composite reinforcement, enters the rib to reinforce the same, while the continuous glass fibers bridge across the rib.

The major design consideration is that the juncture points where the rib or boss meets the basic laminate have a sharp or minimum lead-in radius. This lead-in radius should be no greater than .005 - .01 inch, as contrasted with previously recommended "generous" lead-in radii of from 1/8 to ¼ inch. This geometry tends to minimize segregation of material flowing into the ribs and bosses as well as minimize the cross-sectional area of this juncture.

The material and design approaches may be used separately to minimize "sink" and, the visual distortion caused by that differential thermal shrinkage resulting from material non-uniformity and glass orientation as the rib fills and the resin exothermically cures.

4 Claims, 3 Drawing Figures

SINK-FREE PANELS

This is a continuation of application Ser. No. 430,844, filed Jan. 4, 1974, now abandoned.

BACKGROUND OF THE INVENTION

This invention is concerned with complex, matched metal die molded parts of essentially glass reinforcement fibers embedded in a matrix of essentially thermosetting synthetic resins. The material system is commonly referred to as sheet molding compound (SMC). Such parts are commonly utilized as automotive component panels, e.g., roof panels, deck and hood lids, and the like.

Such panels necessarily have incorporated therein integrally formed ribs, bosses, or other structural reinforcements or fastening locations, and the term "rib" as herein used is intended to generically indicate such reinforcements and locations. The formation of integral ribs on the underside of the exposed surface of such a panel necessarily requires an abrupt change in the thickness of the molded part. In order that the part can be acceptable for automotive use, a blemish-free exposed surface is required, and any interruption or even the most minute surface depression in the panel surface, i.e., one mil or less in depth, will render the panel unacceptable for automotive use. The term "sink" utilized herein to define such localized depression in the surface continuity of the panel.

Generally, sink is the result of the designed cross-sectional change inherent in the formation of such panels. It is generally accepted that the two major causes of sink in thermoset plastic moldings are polymerization shrinkage and thermal shrinkage.

Polymerization shrinkage is the volumetric change which occurs when polyester resins or other thermoset resins are polymerized and cross-linked. This type of shrinkage can be minimized by the utilization of "low-profile" additives, as is well known in the art. Generally, some type of thermoplastic, such as styrene, which is soluble in the polyester monomer is added to the polyester for co-polmerization to form a discontinuous phase as the polyester is cured. By the use of such low-profile resin systems, polymerization shrinkage is virtually eliminated as a cause of "sink" formation.

Thermal shrinkage may be of several different types. Overall thermal shrinkage is due to the conditions under which the parts is molded, e.g., the difference in temperature between the as-molded panel and the ambiant atmosphere, the time and pressure of molding, etc. Secondly, thermal shrinkage can occur locally between different portions of the molded panel, and this factor can be minimized by the geometry of the part. The larger the mass of material in the rib or boss, the greater the temperature differential that occurs when the resin cross-links. Thus, it is desirable to use thin ribs. These two factors of overall thermal shrinkage and localized thermal shrinkage and the use of low-profile resins are all known in the prior art as explained in a paper presented by J. J. McCluskey and R. Z. Bell to the Twenty-Sixth Annual Conference of the Society of the Plastics Industry on February 9-12, 1971, at Washington, D.C.

BRIEF SUMMARY OF THE PRESENT INVENTION

The present invention proposes a solution to the problems of thermal shrinkage in glass fiber reinforced, essentially thermosetting resin panels having integrally formed reinforcing ribs, as above explained. The term "essentially thermosetting resin" is used to encompass within its scope not only polyester and similar thermosetting resins, but also the "low-profile" resins as above explained. Of course, the resin matrix contains an inorganic filler, such as calcium carbonate, in a filler-to-resin ratio preferably ranging from 1-to-1 to 1.75-to-1. Such specific resin formulations are well known in the art and form no part of this invention.

As above explained, the present invention is addressed to the problem of thermal shrinkage due to material non-uniformity between the resin, the filler and the glass of the molded panel. Surprisingly enough, the work of McCluskey and Bell indicates that the degree of sink is independent of the glass content of the molding composition, at least for glass contents ranging from 25 to 35 percent of the total composition. However, the glass fiber lengths had a great effect, with a 50 percent or greater reduction in the extent of sink using fiber lengths of one-half inch to one-quarter inch as compared with fiber lengths of three inches. Finally, the work of McCluskey and Bell reduced the extent of sink, but did not succeed in its elimination. The authors admitted in the paper that their work "doesn't offer a solution to the sink problem".

The common technique of molding using sheet molding compound or "SMC" involves the use of several plies of the molding sheet. It has now been determined that the mechanism of molding panels with integral ribs from a sheet molding compound containing a plurality of plies has several effects. First, the SMC plies retain their integrity even during the filling of the rib with very little inner-laminar mixing during the filling of the mold. In the mold, it appears that the panel is laterally filled first and the ribs are filled by a back flow, the plies adjacent to the rib looping into the rib as necessary to fill out the rib shape. As the plies loop into the rib, a resin-rich, lower glass content area is formed immediately over the rib. The normally higher thermal expansion coefficient of this resin-rich area results in a differential shrinkage as the part cools from the molding temperature to room temperature.

The present invention proposes (1) that the resin-rich area be minimized by substantially eliminating the lead-in radius or "fillet" at the juncture of the rib with the remainder of the laminate, and (2) that a uniform "long fiber" glass layer be established in the upper or exposed surface region of the laminate to bridge across the rib location, thus forcing the minimized resin-rich area away from the surface and further into the laminate, so that localized internal thermal shrinkage will not "read through" to the surface. The term "longer fiber" means fibers having an average length of at least 2 inches. The preferred "long fiber" is a continuous fiber.

Conventionally, sheet molding compounds for making a one-eighth inch thick molded panel contain more than one ply of resin-impregnated glass fibers. By utilizing "long" fiber mats in the upper 25–50% of the composite sheet molding compound and chopped strands in the remainder and by utilizing appropriate rib lead-in radii, sink in the final ribbed panel can be virtually eliminated. Of course, as shown in the art, the use of low-profile resins and thin ribs are also essential in eliminating sink.

It is, therefore, an important object of the present invention to provide molded panels of glass fiber reinforced resins provided with integral reinforcing ribs and free of surface sink or other visible surface discontinuities.

Another important object is the provision of a method of making ribbed glass fiber reinforced panels by utilizing a composite sheet molding compound including long fibers bridging the rib and positioned adjacent the non-ribbed panel surface forming portion of the mold, and molding the composite compound in the mold with the long fibers preventing deformation of the surface of the panel.

Yet another, and no less important, object of the present invention is the formation of a sink-free, resin-glass fiber panel having integrally formed ribs, with the non-ribbed surface of the panel being free of visual distortion due to (1) long glass fibers bridging the panel rib and located immediately adjacent the exposed panel surface, and (2) the joining of the rib to the panel through minimal lead-in radii.

Other and further objects of the invention will become apparent from the following description of the invention and the appended claims.

ON THE DRAWINGS

AS SHOWN ON THE DRAWINGS

Figure 1:
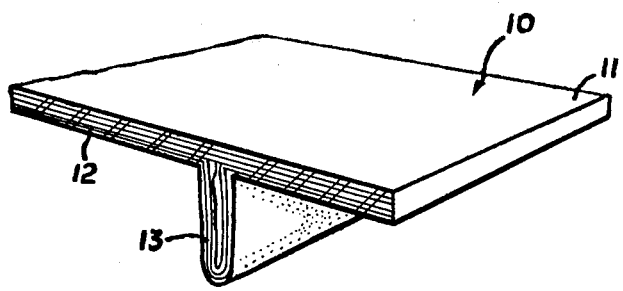
FIG. 1 is a fragmentary perspective view, with parts broken away and in section of a panel of the present invention made in accordance with the method of the present invention.

In FIG. 1, reference numeral 10 refers generally to a panel of the present invention having an upper exposed surface 11 of generally planar configuration, a main panel body 12 and a depending integral rib 13.

The panel 10 may be a structural component, for example, the deck lid, hood lid, roof or the like, of an automobile, and the surface 11 must be perfectly contoured to the desired shape and free of visually apparent "sink" over the rib 13.

Figure 2:
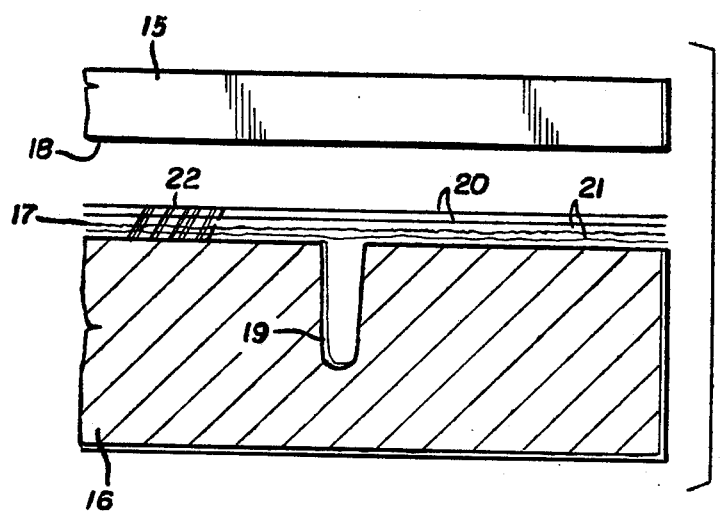
FIG. 2 is a fragmentary sectional view of a mold utilized in the practice of the method of the present invention and illustrating the charging of the mold prior to forming of the panel of FIG. 1.

The panel 10 is manufactured as illustrated in FIG. 2 of the drawings, wherein a pair of separable mold halves 15, 16 confine therebetween composite sheet molding compound 17 from which the panel 10 is formed. The mold half 15 has a planar undersurface 18 which will form the upper planar surface 11 of the 10, while the mold 16 has a groove 19 formed therein which will form the reinforcing rib 13.

The compound 17 comprises essentially a pair of groups of upper "long strand" glass fibers 20 and a pair of groups of lower "chopped strand" glass fibers 21 both groups of fibers being impregnated with a resin 22. The term "long strand" includes strands which are at least 2 inches long or continuous, while the term "chopped strand" includes strands generally 1 inch long or shorter.

Considering first the resin 22, this resin is preferably of the low-profile type heretofore described and containing an inorganic filler, such as calcium carbonate, in a filler-to-resin ratio of from about 1.5-to-1 to about 1.75-to-1. Other normal resin components for compression molding resins are included in the resin 22 including, for example, zinc stearate as a mold release, a catalyst for the resin and magnesium hydroxide. The resin 22 may also be a thermoplastic resin, if desired. As above explained, the formulation of the resin has no part of the present invention.

The long strands 20 and the chopped strands 21 are present in an amount to give a total glass content in the composite 17 of from twenty to thirty percent, and both fibers are preferably made with a minimum binder content.

The chopped strand fibers 21 are, of course, randomly oriented, but the long fiber strands 20 are preferably oriented so as to lie normal to the length of the rib 13, thereby bridging the rib groove 19.

After assembly of the composite 17 between the mold sections 16, the mold sections are closed and the composite is heated and maintained under pressure in the closed die under conditions such as to insure complete curing of the thermosetting resin composition 22 within the closed mold. Satisfactory molding cycles are set forth in the above referenced paper of McCluskey and Bell. In the event the resin 22 is a thermoplastic, appropriate cooling and soldification cycles are utilized.

Figure 3:
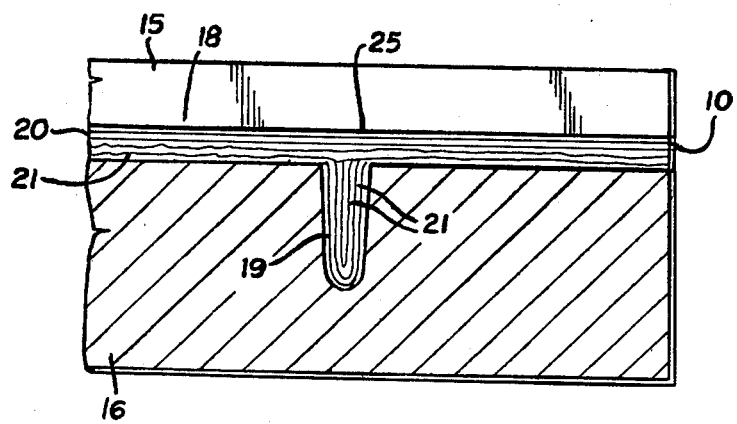
FIG. 3 is a view similar to FIG. 2 and illustrating the molding of the panel of FIG. 1 following the mold charging operation of FIG. 2.

As above explained, sheet molding compounds of the type herein utilized and when molded in accordance with this invention, normally fill the lateral or horizontal space between the mold sections 15 and 16 in the initial stages of the molding operation, and the rib groove 19 of the mold apparently is filled by back flow, with the chopped strands 21 flowing into the rib in closed loops as illustrated in FIG. 3. However, the long strands 20 have high structural integrity and will not be displaced into the rib groove 19. The long strands continue to directly underlie the surface 18 of the upper mold 15 and continue to reinforce the panel 11, as illustrated in FIG. 1, in closely underlying relationship.

From FIG. 3, it will be seen that the deflection of the chopped strands 21 downwardly into the groove 19 to form the rib 13 results in the formation of a "wedge" or somewhat triangularly shaped area 25 directly overlying the groove 19 which is resin-rich and of lower glass content. Upon exothermic curing of the resin composition 22, a different temperature gradiant will exist in this area 25 than throughout the remainder of the composite, due to the substantial absence of glass. Further, this area 25 is not stabilized against thermal shrinkage upon cooling from the molding termperature to room temperature. Consequently, this area 25 will shrink to a greater degree than will the glass-containing areas distributed throughout the remainder of the panel 10. As a result, this shrinkage normally would show up as a depression in the surface 11 of the panel 10 overlying and substantially coextensive with the underlying rib 13.

It will be seen from FIGS. 2 and 3 of the drawings that the rib 13 joins the under surface of the panel 10 through a sharp, slightly obtuse angle, due to the necessary "draft" of the groove 19. This angular juncture of the rib groove 19 and the panel surface 18 is of minimal lead-in radius, about 0.01 inch or less, so that the rib 13 and the panel body 12 join through an essentially angular, fillet-free joint. It has been found that this geometry of the mold and the resultant produce results in minimizing the inherently present resin-rich area 25 which is formed over the rib location. The mechanism by which this is accomplished is not completely clear at this time, but the flow pattern during filling of the essentially fillet-free rib groove 19 of this invention during molding is different from that obtained by the use of the conventional "generous fillet" rib-panel junctures heretofore utilized. Apparently, this different flow pattern results an almost vertical displacement of the chopped fiber-resin lower portions of the composite sheet molding compound into the groove 19.

Consequently, the resin-rich area does not extend laterally to any appreciable extent and is confined to that space directly overlying the rib 13.

The presence of the long glass fibers 20 in those areas of the panel 10 directly overlying the rib 13 serves to stabilize this portion of the panel to prevent the downward shrinking of the surface 11, regardless of the greater shrinkage occurring in the resin-rich area 25. Accordingly, there will be less "sink" in the panel surface 11, such as is usually observed in panels of the construction illustrated in FIG. 1.

In essence, the long strands 20 form a uniform glass layer which is established across the rib 13 to lie normal to the longitudinal axis of the rib, and this uniform glass layer stabilizes the surface 11 to minimize sink. When this layer is combined with the essentially fillet-free rib design, no visible sink will appear in the non-ribbed surface of the panel 10.

In a large mold of multiple configuration having spaced ribs or the like, the long strands 20 may not be coextensive with the entire surface 11, so long as the sufficient long fibers are present to form the uniform glass layer over or across all of the ribs 13 of the panel 10.

One preferred embodiment of the invention which has effectively eliminated sink utilized two plies of ten ounce per square foot continuous strand 20 and two plies of ten ounce per square foot one-half inch chopped strand 21 as the glass layers in the composite sheet molding compound 17, the composite having an overall thickness of 0.10 inch in its finally molded configuration. Satisfactory ribs 13 ranging in length or vertical extent from 1 to 1.75 inches and having a width ranging from 0.375 to 0.10 inches have been formed integrally with a panel made from such a laminate. These ribs were essentially fillet-free, being formed in a groove 19 joining the remainder of the mold through a lead-in radius of less than 0.010 inch. As above explained, the total glass content is from twenty to thirty percent of the total composite composition, and it has been determined that there is less tendency for sink formation at thirty percent glass content than at twenty percent glass content.

Preferably, the length of the fibers in the chopped strand component vary from one-half to one inch, although bulk molding compound having fiber lengths of from ⅛ to ¼ inches may be substituted for the chopped strands 21, if desired.

We claim:

1. An as molded glass fiber reinforced plastic panel having an integrally formed rib and an exposed smooth surface free of visual surface distortion, comprising,
    chopped glass strands having an average length of not more than one inch extending into said rib to reinforce the rib,
    continuous glass strands having an average length of at least two inches interposed between said chopped strands and said exposed surface, the continuous strands bridging the rib, and
    the juncture of said rib with said panel being defined by sharp, essentially fillet-free corners in that any lead-in radius is less than the order of magnitude of approximately 0.01 inch.

2. An as molded structural panel having an exposed surface and an integral reinforcing rib underlying said surface said panel comprising,
    a first reinforcement layer including chopped glass strands having an average length of not more than one inch spaced from said panel surface and extending into said rib, a second reinforcement layer including longer glass strands having an average length of at least two inches interposed between the chopped strand lamina and said panel surface, the longer strands bridging the location of said rib without substantial deflection away from said surface, and said rib being joined to the remainder of said panel through an essentially fillet-free joint in that any lead-in radius is less than the order of magnitude of approximately 0.01 inch.

3. An as molded resinous component having an exposed surface and an integral reinforcing rib underlying said surface, said component comprising:
    a plurality of layers of glass fiber reinforcement in a matrix of resin,
    said plurality of layers including at least one layer of chopped glass strand having an average length of not more than one inch reinforcing the body of said component, including said rib, and at least one layer of continuous glass strand concentrated near said surface and bridging the location of said rib to overlie said rib without substantial deflection relative to said surface.
    said rib joining said molded component through an essentially fillet-free joint in that any lead-in radius is less than the order of magnitude of approximately 0.01 inch.

4. An as molded component having an exposed surface and an integral linear reinforcing rib underlying said surface said component comprising:
    a plurality of lengths of glass fiber reinforcement in a matrix of solidified resin,
    said plurality of lengths including chopped glass strands having an average length of less than one inch distributed throughout the body of said component, said chopped strands extending into said rib leaving a relatively glass-free wedge directly overlying said rib,
    and long glass strands having an average length of at least two inches closely underlying the non-ribbed exposed surface of said component, the long glass strands bridging across said rib without substantial deflection toward said rib and isolating
    the relatively glass-free wedge from the exposed surface
    said rib joining said component through an essentially fillet-free joint in that any lead-in radius is less than the order of magnitude of approximately 0.01 inch.

* * * * *

UNITED STATES PATENT AND TRADEMARK OFFICE
CERTIFICATE OF CORRECTION

PATENT NO. : 4,051,290

DATED : September 27, 1977

INVENTOR(S) : Ralph B. Jutte et al.

It is certified that error appears in the above—identified patent and that said Letters Patent are hereby corrected as shown below:

On the cover page, Item [75], "Roger L. Lehman" should read:
--- Roger R. Lehman ---.

Signed and Sealed this

Twenty-second Day of May 1979

[SEAL]

Attest:

RUTH C. MASON
*Attesting Officer*

DONALD W. BANNER
*Commissioner of Patents and Trademarks*